2,951,793

ELECTROLYSIS OF THORIUM AND URANIUM

Wilford N. Hansen, Reseda, Calif., assignor, by mesne assignments, to the United States of America as represented by the United States Atomic Energy Commission No Drawing. Filed Oct. 9, 1957, Ser. No. 689,041

13 Claims. (Cl. 204—1.5)

This invention relates to a method of obtaining pure thorium, uranium and thorium-uranium alloys. More particularly, this application relates to an electrolysis method of obtaining purified thorium, uranium and thorium-uranium alloys.

In the operation of a nuclear reactor, a great variety of fission products are formed. Many of these elements have high neutron absorption cross-section, and compete with the fissionable material for available neutrons. They thus act as reactor "poisons," and if unremoved may threaten the continuation of the chain fission reaction. Plutonium is formed in uranium-fuel reactors, and if unremoved after its equilibrium concentration has been reached, it may undergo fission at an uneconomical rate relative to its production, thereby sacrificing a valuable product. For these reasons reactor fuels are removed from a reactor for reprocessing long before the fissionable material has been consumed. The uranium in a spent fuel element represents an extremely valuable material, which when decontaminated may be refabricated into fuel elements. For information concerning the processing of nuclear reactor fuels, reference is made to Glasstone, "Principles of Nuclear Reactor Engineering" (D. Van Nostrand Co.), chapter VII, pages 371–442.

It is estimated that the present reprocessing costs amount to as much as 25 percent of the total operating costs of a reactor. It can be appreciated that any reduction in this cost will greatly reduce the unit cost of generating nuclear power and improve its competitive position against power production from fossil fuels. As indicated in the above reference, the standard present method for decontaminating reactor fuels is by solvent extraction methods. Typically in such methods, an aqueous uranyl nitrate solution is countercurrently contacted with an organic extractant, such as tri-butyl phosphate, in an inert hydrocarbon diluent. The uranium and plutonium are extracted into the organic phase, while the majority of the fission products are confined to the aqueous phase. The uranium and plutonium are subsequently partitioned with an acidified aqueous strip solution. There are severe economic drawbacks to the solvent extraction recovery methods. One of these is that the irradiated fuel must be stored for at least sixty to ninety days to permit decay of shortlived fission products. This is done to reduce the radiation dosage received by the organic extractant since organic materials decompose to some extent under nuclear radiation. The unproductive storage of reactor fuels for several months prior to reprocessing greatly increases inventory charges. Then, before the metallic fuel can be introduced into the solvent extraction system, it must be dissolved with nitric acid to yield uranyl nitrate. Thereafter, upon completion of decontamination, the uranium must be reconverted to the metallic form for fuel element preparation. Each of these steps adds considerably to the reprocessing costs. The solutions treated are relatively dilute and enormous volumes of radioactive solutions must be handled. This contributes to the major capital investment in a solvent extraction plant. Until such high costs can be reduced, nuclear reactors will remain at an economic disadvantage.

Another method of purification is by electrolysis. This method has been employed in the fused salt electrolysis of thorium and uranium. Electrolysis of the metals must necessarily be from a non-aqueous system because of their reactivity with water under electrolysis conditions liberating hydrogen at the cathode rather than depositing uranium or thorium. These attempts to electrolyze either of the two metals thorium or uranium from a fused salt bath has not been too successful. One of the disadvantages of this process is that the metal forms a dendritic and/or powdery deposit upon the cathode with the result that it is difficult to separate from the fused salt bath. When the cathode is removed, a large amount of the fused salt is removed with it due to the dendritic nature of the cathode. This necessitates further separation steps to remove the salt electrolyte. Also the powdered uranium and thorium metal tends to become separated from the cathode and settle as a sludge on the bottom of the electrolytic cell. Hence a problem is presented of separating the powdered metal from the electrolyte. A need therefore exists for a process of purifying thorium and uranium and thorium-uranium alloys which will overcome the shortcomings of the prior processes.

It is therefore an object of this invention to provide a process for the production and purification of thorium, uranium, and thorium-uranium alloys. It is also an object of this invention to provide a method for obtaining thorium, uranium, and thorium-uranium alloys in a substantially pure state. Another object is to provide a process for purifying thorium, uranium, and their alloys which have become contaminated by fission products. Still other objects will become obvious from the discussion which follows.

The above and other objects of this invention are accomplished by the method of purifying thorium, uranium, and thorium-uranium alloys comprising providing an electrolytic cell in which the cathode is composed of a metal selected from the class consisting of zinc, cadmium, tin, lead, antimony and bismuth and subjecting a fused salt electrolyte containing a salt of at least one metal selected from the group consisting of thorium and uranium, to electrolysis in said cell while maintaining the cathode in a molten condition. For example when a fused salt bath of sodium chloride and potassium chloride, containing dissolved thorium chloride, is subject to electrolysis between a graphite anode and molten zinc cathode, the thorium metal, immediately upon deposition, is dissolved in the molten zinc cathode forming a thorium-zinc alloy which remains in the liquid state under the electrolysis conditions. There is no formation of a dendritic deposit as is the case when an inert solid cathode is employed. Consequently, there is no contamination by the fused salt electrolyte or occlusion of impurities contained in the bath within the purified metal. Upon completion of the electrolysis, the metal is separated from the zinc of the cathode by volatilization of the zinc by well-known methods. The thorium is thus obtained in a purified state with a minimum number of process steps and consequently by a very favorable economical process. This is in addition to the fact that the metal is obtained with a minimum amount of handling in a much purer state than has been possible either by prior art electrolysis or by any other process.

An embodiment of this invention comprises electrolyzing thorium and/or uranium from its salt contained in a fused salt electrolyte in an electrolytic cell in which the cathode is composed of a molten metal as described above and the anode consists of a solid material containing the thorium and/or uranium which is to be purified. An example of such thorium and/or uranium is reactor fuel contaminated with fission product impurities. Upon electrolysis, the thorium and/or uranium metal goes into solution in the fused salt at the anode and is deposited at the cathode where it immediately goes into solution in the molten metal of the cathode forming an alloy with the latter. This alloy remains in a molten state under the conditions of the electrolysis process.

An improvement over the above described method of obtaining purified thorium and/or uranium, which constitutes a preferred embodiment of this invention, comprises providing an electrolytic cell in which each of the electrodes are composed of a metal selected from the class consisting of zinc, cadmium, tin, lead, antimony and bismuth, wherein the anode and the cathode are composed of the same or different metal or mixture of metals or alloys, and the anode contains in addition at least one of the metals selected from the group consisting of thorium and uranium in an impure state, and subjecting a fused salt electrolyte containing a salt of at least one of said thorium and uranium metals, to electrolysis in said cell while maintining the cathode and at least that portion of the anode composed of a metal selected from the class consisting of zinc, cadmium, tin, lead, antimony and bismuth in a molten condition.

The anode and the cathode are kept separated in the electrolytic cell in a manner well known to those skilled in the art. An example of a simple electrolytic cell is a graphite container which acts as the anode and which can also have metal, molten metal alloys and mixture thereof as part of the anode material. The metal or metal alloys is covered with the fused salt bath contained in the graphite vessel. An alumina container with molten cathode material therein is suspended in the fused salt. The fused salt makes contact with both the anode and with cathode metal. A more complete description of an electrolytic cell setup is given in the examples hereinbelow.

The advantage of the above preferred method of purifying thorium and/or uranium is that the impurities consisting of metals more noble than thorium and/or uranium, such as ruthenium, are dissolved in the molten anode and remain there while the thorium and/or uranium first dissolve in the molten anode and are then electrolyzed in the cell, deposited at the liquid metal cathode and immediately dissolved in the latter. The advantage of having the more noble metal impurities dissolve in the anode is that they are in this manner prevented from being transported as tiny particles in the fused salt and physically deposited at the cathode.

For example, when the impure thorium and/or uranium metal composing the anode is covered with a molten metal, as described above, the factor by which the ruthenium contamination is reduced is substantially increased over the decontamination effected when no molten metal is employed in the anode.

When the anode consists of one or more of the molten metals, zinc, cadmium, tin, lead, antimony, and bismuth containing the thorium and/or uranium metals to be purified, it is preferred that the molten metal completely cover the impure thorium and/or uranium so that the latter do not come into physical contact with the fused salt electrolyte, otherwise, there is greater danger of some of the impurities being liberated into the fused salt during dissolution of the impure thorium and/or uranium upon electrolysis and, hence, of the impurities transported to the cathode. If, however, the molten metal completely covers the material to be purified, the thorium and/or uranium, during electrolysis, must first dissolve in the molten metal of the anode before coming in contact with the fused salt from whence it is electrolyzed and deposited at the cathode. In this manner the impurities either dissolve in the molten anode or the small particles of impurities are wet by the molten anode metal and thus prevented from being carried to the cathode. An alternative method is to first prepare an alloy of the material to be purified with one or more of the metals selected from the class consisting of zinc, cadmium, tin, lead, antimony and bismuth and then to use this alloy as the anode in the electrolytic cell and conduct the electrolyltic purification under conditions such that both the cathode and the anode are in a molten state.

The fused salt electrolyte employed in the process of this invention consists of a salt of at least one of the alkali and/or alkaline earth metals. Non-limiting examples of such salts are lithium chloride, lithium fluoride, sodium chloride, sodium fluoride, potassium chloride, postassium fluoride, magnesium chloride, calcium bromide, beryllium nitrate, sodium nitrate, potassium nitrate, lithium sulfate, calcium sulfate, as well as mixtures of two or more of these salts. The requirements are that the salt electrolyte or salt mixture must be molten at the reaction temperature. Also the decomposition potential of any of the bath constituents should be higher than that of the corresponding thorium or uranium salt which is being electrolyzed. In addition, the electrolyte salt should be unreactive toward the cathode components. Other fused salt electrolytes satisfying the above requirements will be evident to those skilled in the art.

Briefly, the apparatus consists of an electrolytic chamber or container, containing anode and cathode compartments suitable for accommodating molten metal electrodes. The electrode compartments are positioned or constructed in a manner such that there is no direct physical or electrical contact between the electrodes. A fused salt electrolyte makes contact between the electrodes.

The temperature range at which the electrolysis is conducted depends on the melting and boiling points of the zinc, cadmium, tin, lead, antimony, bismuth and/or mixtures of two or more of these metals which are employed as the cathode and/or anode. For example, when zinc is employed, the temperature range is from about 418° C. to about 900° C.; when cadmium is employed, the temperature range varies from about 321° C. to about 760° C. In like manner, the minimum temperature ranges for antimony, bismuth, lead and tin are about 631° C., 272° C. and 232° C. respectively. The upper temperature limit for the latter elements is substantially 1000° C., since temperatures greater than this tend to result in the introduction of impurities from the container.

Of the different metals used as molten electrodes in the process of this invention, it is preferred to employ zinc and/or cadmium because of the ease with which they alloy with thorium and/or uranium and the ease with which the latter two may be separated from the zinc and/or cadmium cathodes. The use of zinc is especially preferred and when it is employed it is preferred to carry out the electrolysis at a temperature within the range of from about 750° C. to about 850° C. in order to obtain a high degree of solubility of the cathode deposit in the zinc.

When impure thorium and/or uranium is being electrolyzed from a fused salt bath employing an inert anode such as graphite, the thorium and/or uranium salt is added directly to the salt employed as the solvent electrolyte in the bath. An example of such an electrolyte is a eutectic mixture composed of 50 mole percent sodium chloride and 50 mol percent potassium chloride. This composition has proven to be satisfactory for the purification of thorium. When the anode contains the metal to be purified, the addition of the salt of this metal to the electrolyte may be dispensed with and in its place may be added a salt of one of the metals selected from the class consisting of zinc, cadmium, tin, lead, antimony and bismuth of which the cathode can be composed. Preferably the salt added to the electrolyte in this case should be a salt of the metal of which the molten cathode is composed in order to simplify separation of the cathode metal from the metal being purified. Upon passing an electric current through the cell, the zinc or other cathode metal salt which has been added, will discharge its cations in the molten metal cathode. These cations will be replaced in the bath by cations of the anode metal which is to be purified. Thus, while no salt of the metal to be purified is required in the electrolyte at the beginning of the process, nevertheless, the purification consists of a deposition of a thorium and/or uranium metal out of fused electrolyte salt solution. However, the modification of the process which employs an anode containing the thorium and/or uranium metal to be purified and a salt of the cathode metal in the electrolyte is an improvement in that it obviates the necessity of preparing a salt of either thorium or uranium for use in the fused salt bath at the beginning of the electrolysis.

When the anode consists of an alloy of the thorium and/or uranium metals to be purified together with one or more of the metals selected from the class consisting of zinc, cadmium, tin, lead, antimony and bismuth, the amount of thorium and/or uranium in the alloy can vary from about 0.1 weight percent to a maximum which permits the alloy to remain in a molten condition at the temperature at which the electrolysis is carried out. When the amount of thorium and/or uranium falls below about 0.1 weight percent, its activity is reduced to the point at which impurities may more readily enter the bath. Since this would result in possible contamination of the cathode, it is preferred to have at least about 0.1 weight percent of the metal to be purified in the anode. For example, the amount of thorium, containing up to about 30 weight percent fission product impurities, that can be alloyed with zinc can vary from about 0.1 weight percent to about 10 weight percent at 900° C. This provides an alloy which remains in a liquid state at temperatures as low as 900° C. However, it is to be noted that all that is required is that the metal of the molten anode cover or wet the thorium and/or uranium being purified since any solid thorium and/or uranium that is present will slowly dissolve in, or alloy with the molten anode metal as electrolysis proceeds and the metal being purified is removed from the anode. The following examples more clearly illustrate the process of this invention:

*Example I*

The electrolytic cell used consists of an electrolyte container composed of graphite with a fused sodium chloride-potassium chloride salt electrolyte. Suspended in the salt is an open cup-shaped alumina container with molten zinc therein. The alumina container is of such dimensions that it was totally immersed in the fused salt electrolyte. The alumina container, in addition to the open top, has holes in its walls above the molten zinc cathode which rests on the bottom of the alumina container. The graphite container serves as the anode in this setup. The electrodes are suitably connected by means of electrical conductors to a source of electricity. The electrolytic cell is equipped with heating means and means for regulating the temperature. The cell is set up in a larger gas-tight container equipped with gas inlet and outlet means which are connected to a source of argon. Argon is kept flowing through the container so as to maintain an atmosphere of inert gas over the electrolyte during the electrolysis process. The electrolyte is composed of an equimolar mixture of sodium chloride and potassium chloride and to this is added 10 mol percent thorium chloride based on the total number of mols in the electrolyte. The impurities consist of 1 weight percent each of ruthenium, molybdenum and zirconium, based on the total weight of thorium, ruthenium, molybdenum and zirconium. The impurities are present in the form of their chloride salts. The temperature of the electrolytic cell is maintained at substantially 800° C. and the cell operated at a current of a density of substantially 200 amperes per dm.$^2$ of cathode surface. The thorium metal is deposited at the molten zinc cathode and immediately goes into the solution to form a thorium-zinc alloy. When all of the thorium has been deposited from the fused salt electrolyte, as indicated by a comparatively rapid rise in voltage across the cell, the process is discontinued, the alumina container with the molten thorium-zinc alloy therein removed from the cell, and the fused salt separated from the alloy by decantation. The alloy is then placed in a high vacuum apparatus equipped with means for collecting volatilized materials, and the zinc distilled out of the alloy under reduced pressure at a temperature of substantially 1100° C., leaving a residue of purified thorium metal. Various stills for the separation of metals by distillation and methods of operation are described by R. W. Endebrock and P. M. Engels in "Separation of Polonium from Bismuth by Distillation" (1953), in report No. AECD–4146, available from the Technical Information Service, Oak Ridge, Tenn. A chemical analysis of the thorium metal shows that there remains substantially 0.01 weight percent Ru, 0.005 weight percent Mo, and 0.003 weight percent zirconium. This represents a reduction in the contamination of thorium by Ru, Mo, and Zr, by factors of 100, 200, and 300 respectively.

Similar results are obtained when the fused salt electrolyte employed in the process of Example I consists of an equimolar mixture of potassium chloride and lithium chloride.

Likewise, good results are obtained when the electrolysis process of Example I is carried out with an initial fused salt composition of 45 mol percent calcium fluoride, 45 mol percent lithium fluoride and 10 mol percent thorium fluoride.

*Example II*

The procedure of Example I is followed with the modification that solid thorium-uranium alloy composed of 90 weight percent thorium and containing substantially 1 percent fission products impurities is placed on the bottom of the graphite container and the process carried out until all of the thorium and uranium has been electrolyzed and deposited in the zinc cathode forming an alloy of thorium, uranium and zinc. The amount of zinc in the cathode is such that at the completion of electrolysis the ratio of zinc-to-combined thorium and uranium is substantially 10-to-1. Upon completion of the electrolysis, the zinc is separated from the thorium and uranium metal by distillation under reduced pressure as described in Example I.

To determine the extent of purification, a radio chemical analysis is performed of samples of the alloy prior to electrolysis and also on samples of the electrolysis product. The counts per minute per gram of thorium-uranium alloy of radio active impurities is substantially as follows: Cs, $3.1 \times 10^6$; Ru, $2.8 \times 10^5$; Pu, $2.1 \times 10^4$; Sr—Y, $1.5 \times 10^6$; Zr—Nb, $2.0 \times 10^4$; total rare earths $7 \times 10^4$. The counts per minute per gram of alloy for the different impurities in the purified samples are substantially: Cs, $5 \times 10^4$; Ru, $2.8 \times 10^4$; Pu, $1 \times 10^4$; Sr—Y, $5 \times 10^2$; Zr—Nb, $1 \times 10^2$; and total rare earths, $1.7 \times 10^3$. This constitutes decontamination by factors as follows: Cs 60, Ru 10, Pu 2, Sr—Y 3000, Zr—Nb 20, total rare earths 40.

Similar results are obtained when the anode in the process of Example II consists of cadmium and the initial thorium chloride added to the fused salt solution is replaced by cadmium chloride.

*Example III*

The procedure of Example II is followed with the further modification that a sufficient amount of zinc is added to the graphite container so that at the temperature at which the electrolysis is conducted, the molten zinc covers the thorium-uranium sample on the bottom of the graphite container. Upon electrolysis, thorium and uranium are electrolyzed and deposited at the molten zinc cathode forming an alloy therewith. At the completion of the electrolysis, the zinc is separated from the thorium and uranium as described in Example I. A radio-chemical analysis of the thorium-uranium product shows substantially the following counts per minute per gram of alloy: Cs, $1.5 \times 10^4$; Ru, $1.1 \times 10^3$; Pu, $5 \times 10_3$, Sr—Y, $3 \times 10^2$; Zr—Nb, $5 \times 10^2$; and total rare earths, $1.4 \times 10^2$. This constitutes a decontamination by factors as follows: Cs 200, Ru 250, Pu 4, Sr—Y 5000, Zr—Nb 40, total rare earths 500.

Similar results are obtained when the sample being purified consists of uranium contaminated with 30 weight percent fission product impurities.

*Example IV*

The procedure of Example II is followed employing as anode at the bottom of the graphite container, an alloy of thorium, uranium and zinc. The thorium and uranium consists of substantially 10 percent uranium, 90 percent thorium and 1 percent fission product impurities based on the total weight of thorium, uranium and impurities. The alloy consists of one part of this composition per 9 parts of zinc by weight. Upon electrolysis, pure thorium and uranium metals are deposited at a molten zinc cathode to form a molten alloy which upon separation as described in Example I, yield a thorium-uranium alloy of purity substantially equivalent to the product obtained in Example III.

Good results are also obtained when the procedure of Example IV is followed in the electrolysis of an anode alloy containing substantially 0.2 weight percent thorium in zinc. Substantially one-half of the thorium is electrolyzed to give a cathode product of high purity, thus, leaving an anode containing a residual 0.1 weight percent thorium.

*Example V*

The electrolysis procedure of Example IV is repeated in the purification of a sample of thorium containing 1 weight percent each of ruthenium, molybdenum and zirconium based on the total weight. Upon analysis of the product as in Example I, the impurities are found to be substantially 0.005 weight percent Ru, 0.003 weight percent Mo, and 0.002 weight percent Zr, based on the weight of purified thorium. This represents a reduction of Ru, Mo, and Zr impurities by factors of 200, 330 and 500 respectively.

Similar results are obtained when the molten metal cathode and the molten metal employed with the thorium and uranium in the anode consists of lead in the process of Example IV. Likewise good results are obtained when tin is used in place of zinc. Good results are also obtained when bismuth is substituted for zinc in the process of Example I. In like manner, when antimony is employed in place of zinc in the process described in Example II, good results are obtained.

Upon comparison of Examples I and V, it is seen that when a molten metal anode is employed as well as a molten metal cathode, the impurities are reduced in the metal being purified to a greater degree as evidenced by an increase of from 65 percent to 100 percent. In like manner, a comparison of Examples II and III shows that a very large additional reduction in impurities is obtained when a molten cathode is employed.

The inert atmosphere under which the processes of the above examples were carried out consisted of argon gas. However, other inert gases such as neon and xenon are also used with good results. The various inert gases which can be used will be apparent to those skilled in the art.

The above examples are merely illustrative and it is not intended that the scope of the invention be limited except as described in the specifications and by the appended claims.

I claim:

1. Method of producing a substance selected from the class consisting of thorium, uranium, and thorium-uranium alloys in a purified form comprising providing an electrolytic cell in which the cathode is composed of a metal selected from the class consisting of zinc, cadmium, tin, lead, antimony and bismuth and a fused salt electrolyte containing a salt of at least one metal selected from the group consisting of thorium and uranium in an impure state, and subjecting said salt of said group to electrolysis in said cell while maintaining the cathode in a molten condition, and thereafter separating said substance selected from the class consisting of uranium, thorium, and thorium-uranium alloys from the molten cathode product.

2. The method of claim 1 in which the cathode is composed of zinc.

3. Method of producing a substance selected from the class consisting of thorium, uranium, and thorium-uranium alloys in a purified form comprising providing an electrolytic cell in which the cathode is composed of a metal selected from the class consisting of zinc, cadmium, tin, lead, antimony and bismuth, the anode is composed of at least one of the metals selected from the group consisting of thorium and uranium in an impure state, and a fused salt electrolyte containing a salt of at least one of said metals selected from the class consisting of thorium, uranium, zinc, cadmium, tin, lead, antimony and bismuth, and subjecting said salt to electrolysis in said cell while maintaining said cathode in a molten condition, and thereafter separating said substance selected from the class consisting of uranium, thorium, and thorium-uranium alloys from the molten cathode product.

4. The method of claim 3 in which said cathode is composed of zinc and the fused salt electrolyte contains a salt of zinc.

5. Method of producing a substance selected from the class consisting of thorium, uranium and thorium-uranium alloys in purified form comprising providing an electrolytic cell in which the electrodes are composed of a metal selected from the class consisting of zinc, cadmium, tin, lead, antimony and bismuth and the anode contains in addition at least one of the metals selected from the group consisting of an impurity-containing thorium and an impurity-containing uranium, and a fused salt electrolyte consisting essentially of a salt of at least one of said thorium and uranium metals, passing an electrolyzing current through said cell while maintaining said cathode and at least that portion of said anode composed of a metal selected from the class consisting of zinc, cadmium, tin, lead, antimony and bismuth in a molten condition, and thereafter separating said substance selected from the class consisting of uranium, thorium, and thorium-uranium alloys from the molten cathode product.

6. Method of producing thorium comprising providing the electrolytic cell in which the cathode is composed of zinc and the anode is composed of zinc and an impurity-containing thorium and a fused salt electrolyte consisting essentially of a salt of said thorium, and passing an electrolyzing current through said cell while maintaining said zinc of said cathode and said anode in a molten condition, and thereafter separating the thorium and zinc of said cathode product.

7. The method of claim 6 wherein the separation of thorium and zinc in said cathode product is by vacuum distillation.

8. A process for electrolytically producing a substance selected from the class consisting of thorium, uranium, and thorium-uranium alloys in purified form comprising providing an electrolytic cell having a cathode composed of at least one metal selected from the class consisting of zinc, cadmium, tin, lead, antimony and bismuth, and an anode composed of at least one of the substances selected from the group consisting of fission product impurity-containing thorium and fission product impurity-containing uranim and having a molten electrolyte containing a salt of at least one metal selected from the group consisting of thorium and uranium, in a fused salt bath, wherein the constituents of said fused salt bath have a higher decomposition potential than that of said salt of said group, and wherein the constituents of said fused salt bath are composed of the salt of at least one member selected from the group of substances consisting of a member of (A) alkali metals, alkaline earth metals, beryllium, magnesium and (B) a metal of which said cathode is composed, and wherein at least one of said fused salt bath members is a said group (A) substance and wherein the salts of said group of substances are composed of at least one salt selected from the class consisting of fluoride, chloride, bromide, nitrate, and sulfate salts, and passing an electrolyzing current through said cell while maintaining the cathode in a molten condition, thereby depositing said substance in purified form in said molten cathode, and thereafter separating said substance selected from the class consisting of uranium, thorium, and thorium-uranium alloys from the molten cathode product.

9. The process of claim 8 in which said cathode is composed of molten zinc and wherein at least one constituent of said fused salt bath is a salt of zinc and said anode is composed of fission product impurity-containing thorium.

10. A process for electrolytically producing a substance selected from the class consisting of thorium, uranium, and thorium-uranium alloys in purified form comprising providing an electrolytic cell having electrodes composed of at least one electrode metal selected from the class consisting of zinc, cadmium, tin, lead, antimony and bismuth, and wherein the anode contains in addition at least one substance selected from the class consisting of fission product impurity-containing thorium and fission product impurity-containing uranium, and having a molten electrolyte containing a salt of at least one metal selected from the group consisting of thorium and uranium in a fused salt bath, wherein the constituents of said fused salt bath have a higher decomposition potential than that of said salt of said thorium and said uranium, and wherein the constituents of said fused salt bath are composed of the salts of at least one member selected from the group of substances consisting of alkali metals, alkaline earth metals, beryllium, magnesium and a metal of which said cathode is composed, and wherein the salts of said group of substances are composed of at least one salt selected from the class consisting of fluoride, chloride, bromide, nitrate, and sulfate salts, and passing an electrolyzing current through said cell while maintaining the cathode and at least that portion of said anode composed of said electrode metal in a molten condition, thereby depositing said substance in purified form in said molten cathode, and thereafter separating said substance selected from the class consisting of uranium, thorium, and thorium-uranium alloys from the molten cathode product.

11. A process for electrolytically producing thorium in a purified form, comprising providing an electrolytic cell having electrodes composed essentially of zinc and wherein the anode contains in addition fission product impurity-containing thorium, and having a molten electrolyte containing a salt of thorium in a fused salt bath wherein the constituents of said fused salt bath have a higher decomposition potential than that of said salt of said thorium and wherein the constituents of said fused salt bath are composed of the salts of at least one member selected from the group of substances consisting of alkali metals, alkaline earth metals, beryllium, magnesium and a metal of which said cathode is composed, and wherein the salts of said group of substances are composed of at least one salt selected from the class consisting of fluoride, chloride, bromide, nitrate, and sulfate salts, and passing an electrolyzing current through said cell while maintaining the zinc in said electrodes in a molten condition, thereby depositing thorium in a purified form in said molten zinc cathode, and thereafter separating the thorium and zinc of said cathode product.

12. A process for electrolytically producing thorium in a purified form comprising providing an electrolytic cell having electrodes composed essentially of zinc and wherein the anode contains in addition fission product impurity-containing thorium, and having a molten electrolyte containing a thorium chloride salt in a fused bath wherein the constituents of said fused bath are essentially sodium chloride and potassium chloride, and passing an electrolyzing current through said cell while maintaining the zinc in a molten condition thereby depositing thorium in a purified form in said molten zinc cathode, and thereafter separating the thorium and zinc of said cathode product.

13. The process of claim 12 wherein the separation of thorium and zinc in said cathode product is by vacuum distillation.

References Cited in the file of this patent

UNITED STATES PATENTS

| | | |
|---|---|---|
| 2,431,723 | Yerkes | Dec. 2, 1947 |
| 2,739,111 | Nolan et al. | Mar. 20, 1956 |
| 2,757,135 | Gleave et al. | July 31, 1956 |
| 2,861,030 | Slatin | Nov. 18, 1958 |
| 2,902,415 | Niedrach et al. | Sept. 1, 1959 |

OTHER REFERENCES

NAA–SR–1997, September 30, 1957, pp. 23–25. (Copy in Library.)

Journal of the Electrochemical Society, September 1956, pp. 521–528 (an article by Niedrach et al.), 204–1.5.

Industrial and Engineering Chemistry, June 1956, vol. 48, No. 6, pp. 977–981 (an article by Niedrach et al.), 204–1.5.